(12) United States Patent
Akiyama

(10) Patent No.: US 8,186,688 B2
(45) Date of Patent: May 29, 2012

(54) SHAFT SEALING DEVICE

(75) Inventor: Koji Akiyama, Tokyo (JP)

(73) Assignee: Eagle Industry Co., Ltd. (JP)

( * ) Notice: Subject to any disclaimer, the term of this patent is extended or adjusted under 35 U.S.C. 154(b) by 226 days.

(21) Appl. No.: 12/667,214

(22) PCT Filed: Jan. 28, 2009

(86) PCT No.: PCT/JP2009/051310
§ 371 (c)(1),
(2), (4) Date: Dec. 29, 2009

(87) PCT Pub. No.: WO2009/107440
PCT Pub. Date: Sep. 3, 2009

(65) Prior Publication Data
US 2010/0327533 A1    Dec. 30, 2010

(30) Foreign Application Priority Data
Feb. 25, 2008  (JP) ................... 2008-043451

(51) Int. Cl.
*F16J 15/54* (2006.01)
(52) U.S. Cl. .......................... 277/365; 277/362
(58) Field of Classification Search ........... 277/362, 277/365
See application file for complete search history.

(56) References Cited

U.S. PATENT DOCUMENTS

| | | | |
|---|---|---|---|
| 3,179,422 A | 4/1965 | Phillips | 277/3 |
| 3,813,103 A * | 5/1974 | Wiese | 277/401 |
| 4,964,646 A * | 10/1990 | Boster | 277/365 |
| 7,014,192 B2 * | 3/2006 | Takahashi et al. | 277/361 |

FOREIGN PATENT DOCUMENTS

| | | |
|---|---|---|
| JP | 6042650 | 2/1994 |
| JP | 2002098237 | 4/2002 |
| JP | 2003004147 | 1/2003 |

OTHER PUBLICATIONS

International Preliminary Report on Patentability received in Applicant's corresponding PCT Patent Application Serial No. PCT/JP2009/051310.
International Search Report received in Applicant's corresponding PCT Patent Application Serial No. PCT/JP2009/051310.

* cited by examiner

*Primary Examiner* — Gilbert Lee
(74) *Attorney, Agent, or Firm* — Hayes Soloway P.C.

(57) ABSTRACT

A shaft sealing device in which a load acting on a sliding section of the device is reduced to extend the life of the device and which permits no leakage of fluid in a machine to an atmospheric air. The shaft sealing device has seals arranged in three stages in the axial direction between a seal case and a rotating shaft passed through the inner periphery of the seal case. A first-stage seal on the machine's inner side and a third-stage seal on the machine's outer side have contact type mechanical seal structures in which a rotational sealing element and a stationary sealing element are in close sliding contact with each other. The intermediate second-stage seal has a contactless mechanical seal structure in which a rotational sealing element and a stationary sealing element are kept by dynamic pressure so as not to be in contact with each other. A high-pressure sealing liquid is supplied by the pressure of fluid in the machine to an annular space surrounded by that portion of the seal case which extends from the first-stage seal to the second-stage seal.

17 Claims, 10 Drawing Sheets

SHAFT SEALING DEVICE

TECHNICAL FIELD

The present invention relates to a shaft-sealing device used for reliably sealing in a high-pressure fluid, e.g., a supercritical fluid, and more particularly relates to a shaft-sealing device that can be applied to a device that handles carbon dioxide supercritical fluid.

BACKGROUND ART

A single contact-type mechanical seal (hereinafter referred to as "Prior Art 1") having a single sliding contact surface is a known example of a most commonly used conventional shaft-sealing device, as shown in FIG. 7. This single contact-type mechanical seal has a configuration in which a rotational seal element 2 is provided in a state that allows movement in the axial direction and allows integral rotation with a rotating shaft 1, a stationary seal element 4 is provided in a non-rotating state in the seal case 3, and these seal elements slide in close contact with each other along mutually opposing end faces in accordance with the operation of a spring 5 that urges the rotational seal element 2 in the axial direction.

However, when used as a shaft-sealing device for a high-pressure fluid, the single contact-type mechanical seal has a problem in that the load that acts on a sliding section 6 is large, abrasion of the sliding section 6 is considerable, and the length of time in which a good seal performance can be maintained is short. Also, since the fluid pressure inside a machine is greater than the pressure outside a machine, the fluid inside the machine is liable to leak outside the machine.

Also known is a double contact-type mechanical seal (hereinafter referred to as "Prior Art 2") that has two sliding contact surfaces, as shown in FIG. 8. The double contact-type mechanical seal has a configuration in which two rotational seal elements 2 are provided facing outward in the axial direction in a state that allows integral rotation with a rotating shaft 1, two stationary seal elements 4 are provided in a non-rotating state in the seal case 3 and so as to face the two rotational seal elements 2, respectively, in a state that allows movement in the axial direction, and these seal elements slide in close contact with each other along mutually opposing end faces in accordance with the operation of a spring 5 that urges the stationary seal elements 4 in the axial direction. Also, a seal fluid under higher pressure than the pressure of the fluid inside the machine is introduced into the area between the two sliding sections 6 in order to prevent fluid inside the machine from leaking out.

In the double contact-type mechanical seal, the load that acts on the sliding sections 6 of the inner side of the machine is reduced by an amount equal to the pressure difference between the seal fluid and the fluid inside the machine, but the load that acts on the sliding sections 7 of the outer side of the machine is greater than that of Prior Art 1 because a seal fluid under higher pressure than the pressure of the fluid inside the machine is introduced into the area between the two sliding sections 6. As a result, there is a problem in that the abrasion of the sliding sections 7 is considerable and the length of time in which a good seal performance can be maintained is short. Also, there is a possibility that a large amount of seal fluid may be discharged to the exterior of the machine and such a configuration is less preferred.

Also known is a tandem contact-type mechanical seal (hereinafter referred to as "Prior Art 3") that has two sliding contact surfaces and in which the seal of each sliding contact surface faces the same direction, as shown in FIG. 9. The tandem contact-type mechanical seal has a configuration in which two rotational seal elements 2 are provided in a state that allows integral rotation with a rotating shaft 1, two stationary seal elements 4 are provided in a non-rotating state in the seal case 3 and so as to face the two rotational seal elements 2 in the same direction in a state that allows movement in the axial direction, and these seal elements slide in close contact with each other along mutually opposing end faces in accordance with the operation of a spring 5 that urges the stationary seal elements 4 in the axial direction.

The tandem contact-type mechanical seal is generally used for high-pressure applications or for recovering fluid inside the machine, and in the case of a high-pressure application, the fluid pressure inside the machine is divided between the seal of the inner side the machine and the seal of the outer side the machine, and the load that acts on each sliding section 6 is reduced.

However, since the fluid pressure inside the machine is set to be highest, there is a possibility that carbon dioxide will leak into the atmospheric air in the case that liquid carbon dioxide is used as the fluid inside the machine, and the effect of wear of the sliding sections 6 is dramatic in the case of long-term use. Carbon dioxide that has leaked between the seal of the inner side of the machine and the seal of the outer side of the machine must be recovered.

Also known is a contact/contactless mechanism seal (hereinafter referred to as "Prior Art 4," e.g., see Patent Document 1.) in which a contact-type mechanical seal and contactless mechanical seal are combined, as shown in FIG. 10. The contact/contactless mechanism seal has a contact-type mechanical seal, in which a rotational seal element 2 is provided in a state that allows integral rotation with a rotating shaft 1 of the outer side of the machine, a stationary seal element 4 is provided in a non-rotating state in the seal case 3 and in a state that allows movement in the axial direction, and these seal elements slide in close contact with each other along mutually opposing end faces in accordance with the operation of a spring 5 that urges the stationary seal element 4 in the axial direction. The contact/contactless mechanism seal also has a contactless mechanical seal in which a rotational seal element 7 is provided in a state that allows integral rotation with a rotating shaft 1 of the inner side of the machine, a stationary seal element 8 is provided in a non-rotating state in the seal case 3 and in a state that allows movement in the axial direction, and the mutually opposing end faces are kept by dynamic pressure so as not to be in contact with each other due.

In the contact/contactless mechanism seal, the load that acts on the seal part is low and a large pressure reduction can be produced by the contactless mechanical seal even when the fluid pressure inside the machine is high, because the contactless mechanical seal is disposed in the inner side of the machine. Therefore, the load that acts on the sliding section 6 of the contact-type mechanical seal disposed in the outer side of the machine can be reduced.

However, the contactless mechanical seal disposed in the inner side of the machine has a configuration in which the rotational seal element 7 and the stationary seal element 8 are slightly set apart by the dynamic pressure against the pressing force of the spring 5, a very small gap is formed between the end faces of the rotational seal element 7 and the stationary seal element 8, and a seal function is obtained while fluid inside the machine leaks into the gap. Therefore, fluid inside the machine fills the space between the two mechanical seals and there is a possibility that a portion of the fluid will leak into the atmospheric air from the contact-type mechanical seal of the outer side of the machine. This is a critical problem in a device that handles supercritical carbon dioxide. Also, the carbon dioxide that fills the space between the mechanical seal of the inner side of the machine and the mechanical seal of the outer side of the machine must be recovered.

Patent Document 1: Japanese Laid-open Patent Application No. 2002-98237

DISCLOSURE OF THE INVENTION

Problems to be Solved by the Invention

Techniques for storing carbon dioxide underground in which carbon dioxide is stably stored in an aquifer have recently been researched and are under development. With this technology, carbon dioxide is separated and recovered from exhaust gas that contains carbon dioxide exhausted by sources that generate large amounts of carbon dioxide, and the carbon dioxide is injected into and stored in an underground aquifer.

With foodstuffs, pharmaceuticals, and other fields, there is a movement toward the use of carbon dioxide and water as supercritical fluids to obtain a replacement for organic solvents, and such techniques are being studied for their favorable effect on humans and the environment.

However, the supercritical point of carbon dioxide is 31.1° C. and a high pressure of 7.38 MPa.

A supercritical fluid is in a state in which a limit that allows the coexistence of gas and liquid has been exceeded. Supercritical fluids have diffusive properties and are unique in that they have characteristics differing from those of ordinary gases and fluids. Therefore, a problem is presented in that the load that acts on the sliding sections in Prior Arts 1 and 2 is high and the time period in which good seal performance can be maintained is short in the case that the shaft-sealing devices for Prior Arts 1 through 4 described above are used in a machine that handles supercritical carbon dioxide. There is also a problem in Prior Arts 1, 3, and 4 in that carbon dioxide cannot be reliably prevented from leaking into the atmospheric air. Thus, conventional shaft-sealing devices cannot adequately maintain sealing performance over a long period of time, and supercritical carbon dioxide cannot be reliably prevented from leaking into the atmospheric air.

An object of the present invention is to provide a shaft-sealing device that can reduce the load acting on the sliding section and extend service life, and can eliminate the work for recovering the fluid inside the machine without the fluid inside the machine leaking (into the atmospheric air).

Another object of the present invention is to provide a shaft-sealing device that can accommodate a high-pressure fluid such as supercritical carbon dioxide that has diffusive properties.

Means for Solving the Problems

A first aspect of the shaft-sealing device of the present invention for achieving the objects described above is characterized in that seals are disposed in three stages in an axial direction between a seal case and a rotating shaft passed through an inner periphery of the seal case; among the seals of three stages, a first-stage seal on an inner side of the machine and a third-stage seal on an outer side of the machine have a contact-type mechanical seal structure in which a rotational seal element and a stationary seal element are in close sliding contact with each other; and, among the seals of three stages, an intermediate second stage seal has a contactless mechanical seal structure in which the rotational seal element and the stationary seal element are kept by dynamic pressure so as not to be in contact with each other.

The load that acts on the three stage seals can thereby be reduced.

A second aspect of the present invention is the shaft-sealing device of the first aspect, characterized in that a seal fluid under higher pressure than the pressure of fluid inside the machine is supplied into a first annular space surrounded by that portion of the seal case extending from the first-stage seal to the second-stage seal.

A third aspect of the present invention is the shaft-sealing device of the second aspect, characterized in that a pressure $p2$ of the seal liquid supplied into the first annular space is set in a range of $p1+0.05$ MPa$\leqq p2 \leqq p1+0.5$ MPa, wherein $p2$ is the pressure of the seal liquid supplied into the first annular space and $p1$ is the pressure of the fluid inside the machine.

In accordance with the second and third aspects, leakage of fluid inside the machine to the exterior can be eliminated.

A fourth aspect of the present invention is the shaft-sealing device of the any of the first through third aspects, characterized in that coolant is circulated in a second annular space surrounded by the seal case of the outer periphery of the third-stage seal in communication with the inner peripheral space of the second-stage seal.

A fifth aspect of the present invention is the shaft-sealing device of the fourth aspect, characterized in that a pressure $p3$ of the coolant is set in a range expressed by the relationship: atmospheric pressure $<p3<0.2$ MPa, where $p3$ is the pressure of the coolant.

In accordance with the fourth and fifth aspects, seal fluid that has leaked from the second-stage seal to the third-stage seal can be recovered, and the machine can be cooled in the periphery of the third-stage seal.

A sixth aspect of the present invention is the shaft-sealing device of any of the first to fifth aspects, characterized in that the seal fluid under higher pressure than the pressure of fluid inside the machine is supplied between the outside surface of the rotating shaft and the inside surface of a sleeve fitted and secured to the rotating shaft.

A seventh aspect of the present invention is the shaft-sealing device of the sixth aspect, characterized in that a hole for conducting the seal fluid is provided to the first annular space and between the outside surface of the rotating shaft and the inside surface of the sleeve.

An eighth aspect of the present invention is the shaft-sealing device of the seventh aspect, characterized in that an O-ring is disposed in a position so as to be between the conducting hole and the inner side of the machine, between the outside surface of the rotating shaft and the inside surface of the sleeve.

According to the sixth through eighth aspects, the pressure of the elastomer part of an O-ring for sealing the space between the rotating shaft and the sleeve can be kept at a higher pressure than the fluid pressure inside the machine, and the fluid inside the machine can be prevented from permeating and leaking from the periphery of the rotating shaft to the exterior of the machine.

Effect of the Invention

The present invention has the following exceptional effects.

(1) A first-stage seal of the inner side of the machine and a third-stage seal of the outer side of the machine of the three stage seals have a contact-type mechanical structure in which a rotational seal element and a stationary seal element slide in close contact with each other; and an intermediate second stage seal is a non-contact mechanical seal in which the rotational seal element and the stationary seal element are kept by dynamic pressure so as not to be in contact with each other. Therefore, the second-stage seal, which has the highest load, is a non-contact mechanical seal; and the first-stage and third-stage seals, which have a low load, are contact-type mechanical seals. Accordingly, the service life of all the mechanical seals can be assured. Also, since the second-stage seal which has the highest load is a non-contact mechanical seal, power consumption can be reduced in comparison with an ordinary double contact-type mechanical seal.

(2) Seal fluid under higher pressure than the pressure inside the machine is supplied to the annular space surrounded by the seal case extending from the first-stage seal to the second-stage seal, whereby the fluid inside the machine can be prevented from leaking to the exterior of the machine.

(3) Seal fluid is circulated in the annular space surrounded by the seal case of the external periphery of the third-stage seal of the outer side of the machine, whereby seal fluid that has leaked from the second-stage seal to the third-stage seal can be recovered, and the machine can be cooled in the periphery of the third-stage seal.

(4) The seal fluid at a higher pressure than the pressure of the fluid inside the machine is supplied between the outside surface of the rotating shaft and the inner surface of the sleeve fitted and secured to the rotating shaft, whereby the pressure of the elastomer part of an O-ring for sealing the space between the rotating shaft and the sleeve can be kept at a higher pressure than the fluid inside the machine, and the fluid inside the machine can be prevented from leaking from the periphery of the rotating shaft to the exterior of the machine.

KEY

Figure 1:
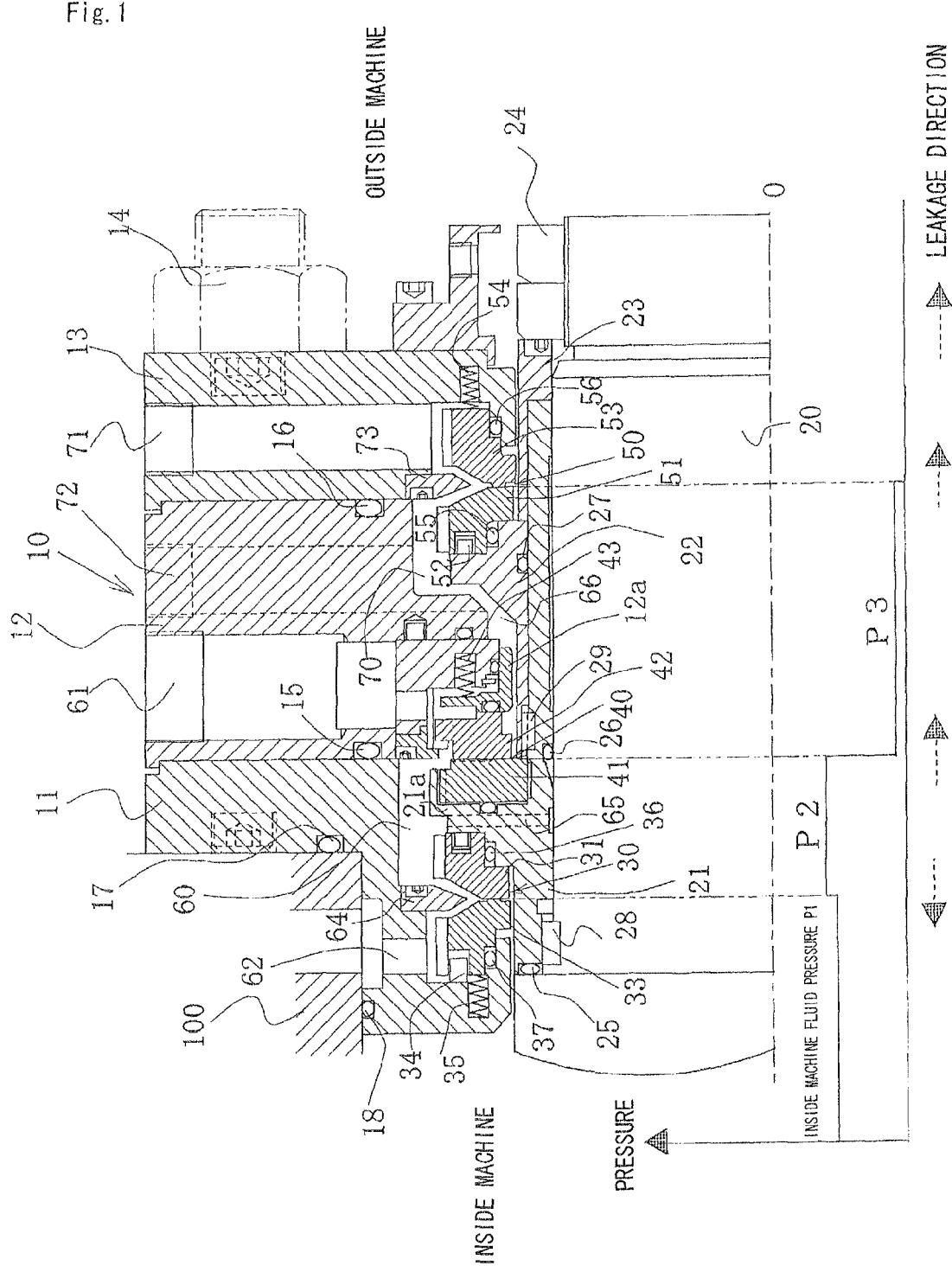
FIG. 1 is a front cross-sectional view showing the entire shaft-sealing device of example 1.

10 seal case
11 seal case partition
12 seal case partition
13 seal case partition
14 bolt and nut
15 O-ring
16 O-ring
17 O-ring
18 O-ring
20 rotating shaft
21 first sleeve
22 second sleeve
23 collar
24 nut
25 O-ring
26 O-ring
27 O-ring
28 key
29 key
30 first-stage seal
31 mating ring for a rotational seal element
32 knock pin
33 seal ring for a stationary seal element
34 knock pin
35 coil spring
36 O-ring
37 O-ring
40 second-stage seal
41 mating ring for a rotational seal element
42 seal ring for a stationary seal element
43 coil spring
50 third-stage seal
51 mating ring for a rotational seal element
52 knock pin
53 seal ring for a stationary seal element
54 coil spring
55 O-ring
56 O-ring
60 first annular space
61 seal oil feed port
62 seal oil discharge port
64 guide member
65 conducting hole
66 inner peripheral space of the second-stage seal
70 second annular space
71 coolant feed port
72 coolant discharge port
73 guide member
100 shaft sealing section housing

BEST MODE FOR CARRYING OUT THE INVENTION

Preferred embodiments for implementing the shaft-sealing device of the present invention are described below with reference to the drawings, but the embodiments are not to be interpreted as limiting the present invention; various modifications, adjustments, and improvements can be made based on the knowledge of those skilled in the art without departing from the scope of the invention.

Example 1

FIG. 1 is a front cross-sectional view showing the entire shaft-sealing device of example 1.

In FIG. 1, the numeral 100 refers to the housing of a shaft-sealing section in, e.g., a compressor, a boiler feed water pump, or a device that handles supercritical carbon dioxide; reference numeral 10 is a seal case mounted on the housing; and the left side of the drawing is the inside of the machine and the right side of the drawing is the outside of the machine (e.g., atmosphere).

The seal case 10 has a plurality of metallic annular partitions 11 to 13 that is coupled together in the axial direction using a bolt and nut 14, and a rotating shaft 20 that rotates and drives a rotating member inside the machine is inserted through the internal periphery of the seal case so as to allow rotation about the axial center O of the rotating shaft. The space between the partitions 11 to 13 of the seal case 10 and the space between the partition 11 and the housing 100 are sealed by O-rings 15 to 18.

A metal first sleeve 21 is mounted on the external peripheral surface of the rotating shaft 20 and the end section of the first sleeve of the inner side of the machine is locked using a key 28 to prevent rotation in relation to the rotating shaft 20, and a metal second sleeve 22 mounted on the external peripheral surface of the center section in the axial direction of the first sleeve 21 is locked using a key 29 to prevent rotation. The end sections of the first sleeve 21 and the second sleeve 22 of the outer side of the machine are secured by a collar 23 and a nut 24. The space between the rotating shaft 20 and the first sleeve 21 is sealed by an O-ring 25 near the inner side of the machine and by an O-ring 26 in the vicinity of the center section. The space between the first sleeve 21 and the second sleeve 22 is sealed by an O-ring 27 near the outer side of the machine.

Three stage seals 30, 40, 50; i.e., a first-stage seal 30 of the inner side of the machine, an intermediate second-stage seal 40, and a third-stage seal 50 of the outer side of the machine are arranged in the axial direction in the peripheral space of the shaft between the seal case 10 and the rotating shaft 20.

The first-stage seal 30 and the third-stage seal 50 are provided with a contact-type mechanical seal structure in which the seal sections of the rotational seal element and the stationary seal element slide in close contact with each other, and the second-stage seal 40 is provided with a contactless mechanical seal in which the seal sections of the rotational seal element and the stationary seal element are kept by dynamic pressure so as not to be in contact with each other.

Figure 2:
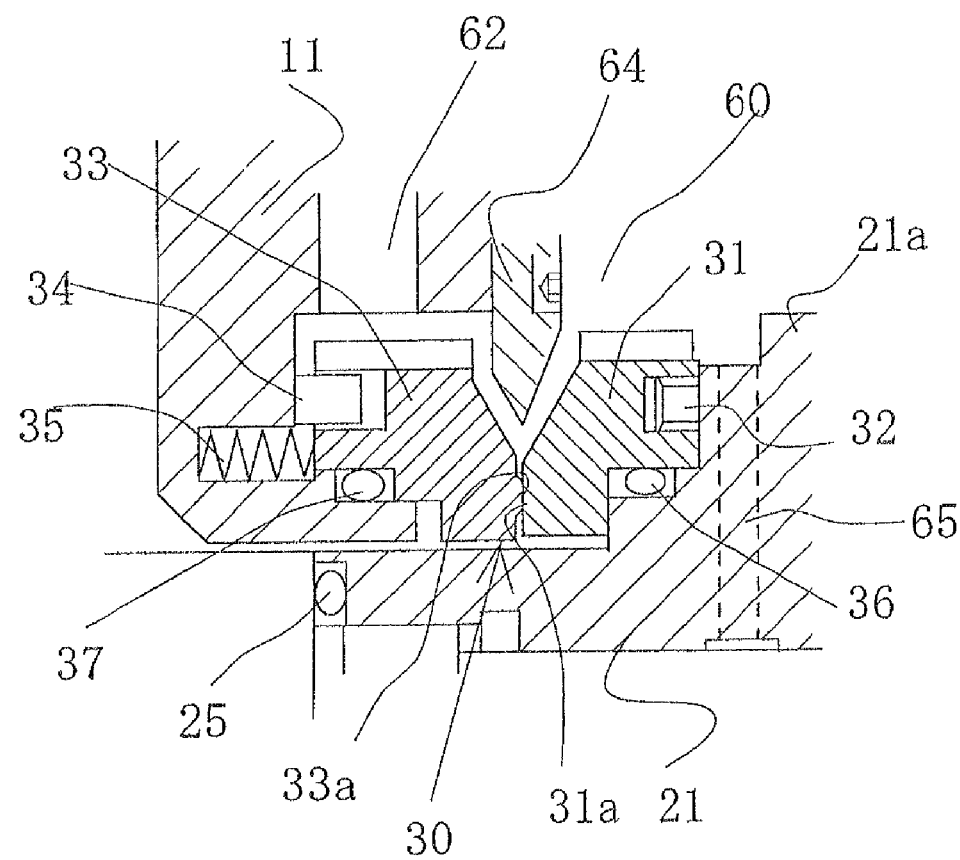
FIG. 2 is an enlarged partial sectional view of the first-stage seal in FIG. 1.

FIG. 2 is an enlarged partial sectional view of the first-stage seal 30 in FIG. 1.

The first-stage seal 30 of the inner side of the machine has a mating ring 31 for a rotational seal element on which the first sleeve 21 is fitted and in which the back surface is supported by a flange 21a of the first sleeve 21, and the mating ring is mounted on the flange 21a using a knock pin 32. Meanwhile, a seal ring 33 for a stationary seal element is disposed opposite the mating ring 31, inserted into the first sleeve 21 and locked so as to prevent rotation via a knock pin 34, and is movably mounted on the seal case partition 11 in the axial direction. The back surface is pressed in the axial direction by a coil spring 35 provided to the seal case partition 11.

The mating ring 31 and the seal ring 33 of the first-stage seal 30 are formed in an annular shape from, e.g., SiC or another hard material. The space between the mating ring 31 and the sleeve 21 is sealed using an O-ring 36, and the space between the seal ring 33 and the seal case partition 11 is sealed using and O-ring 37.

The first-stage seal 30 having the configuration described above has a shaft-sealing function for sealing fluid inside the machine, the fluid being present in an inner peripheral space of the first-stage seal, wherein an end face 33a of the seal ring 33 makes sliding contact with the end face 31a of the mating ring 31 that rotates together with the rotating shaft 20, so as to seal with suitable surface pressure by the urging force of the coil spring 35.

Figure 3:
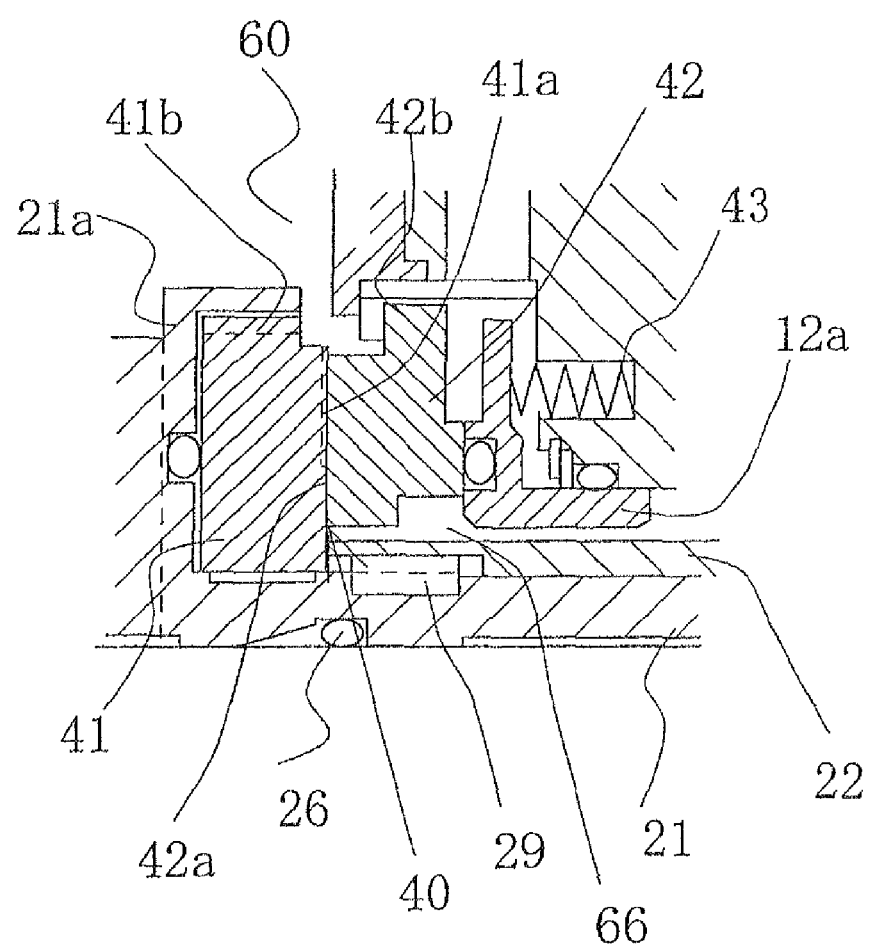
FIG. 3 is an enlarged partial sectional view of the second-stage seal in FIG. 1.

FIG. 3 is an enlarged partial sectional view of the second-stage seal 40 in FIG. 1.

The intermediate second-stage seal 40 has a mating ring 41 for a rotational seal element in which the back surface is supported by the flange 21a of the first sleeve 21 of the rotating shaft 20, and is mounted in a state in which the external periphery is engaged in the peripheral direction with the flange 21a via an engaging section 41b. Meanwhile, a seal ring 42 for a stationary seal element is disposed in a state that allows movement in the axial direction and is locked so as to prevent rotation in a locking section 42b of the outer periphery by a retainer 12a mounted on the internal periphery of the seal case partition 12; and the back surface is pressed in the axial direction by a coil spring 43 via the retainer 12a and is thereby urged toward the mating ring 41.

Figure 4:
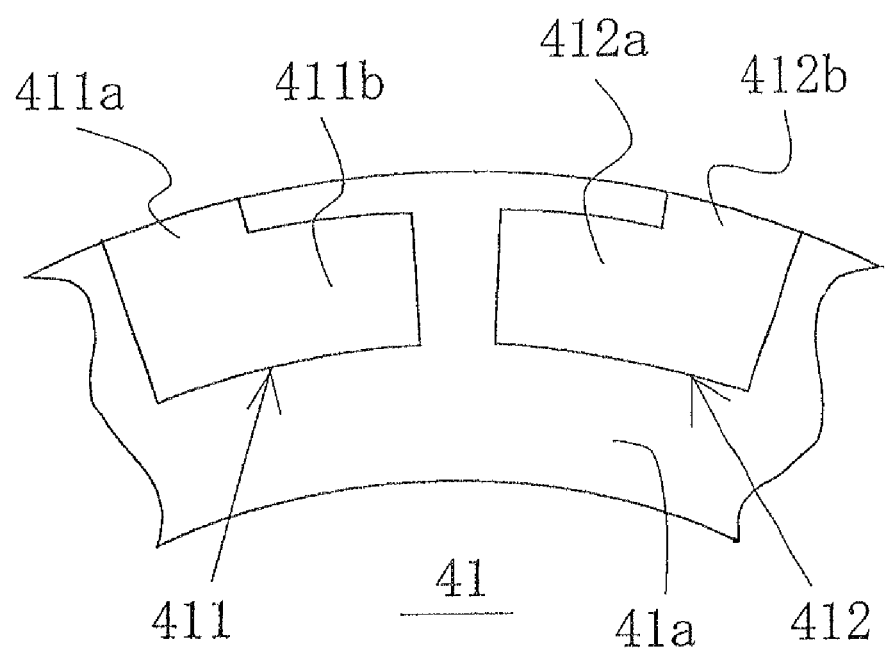
FIG. 4 is a view showing the dynamic pressure-generating grooves formed in the surface of the rotational seal element of the second-stage seal.

FIG. 4 is a view showing the dynamic pressure-generating grooves formed in the surface of the rotational seal element of the second-stage seal 40. A plurality of dynamic pressure-generating grooves 411, 412 that presents substantially L-shaped curve shapes mutually symmetrical in the peripheral direction is formed in alternating fashion in the peripheral direction in the end face 41a that acts as a non-contact seal surface in the mating ring 41 for a rotational seal element, as shown in FIG. 4. The dynamic pressure-generating grooves 411, 412 are composed of portions 411a, 412a that extend in the radial direction from the external peripheral surface and portions 411b, 412b that extend in the peripheral direction. The portions 411b, 412b that extend in the peripheral direction have groove bottoms that form a sloped surface that gradually becomes shallow toward the end section of the side opposite from the portions 411a, 412a that extend in the radial direction.

The dynamic pressure-generating grooves 411, 412 are formed to a micro depth on the order of microns by micro-machining.

The second-stage seal having the configuration described above is one in which the dynamic pressure-generating grooves 411, 412 of the end face 41a generate the dynamic pressure of the fluid (the fluid inside the machine) disposed between [the end face 41a] and an end face 42a of the seal ring 42 when the mating ring 41 rotates together with the rotating shaft 20. Specifically, the dynamic pressure-generating grooves 411, 412 have a configuration in which the groove bottoms of the portions 411b, 412b that extend in the peripheral direction of the grooves are sloped surfaces that gradually become shallow toward the end sections. Therefore, the fluid inside the machine that is drawn into the grooves is compressed in accompaniment with relative movement with the end face 42a of the seal ring 42, and dynamic pressure is generated in the thrust direction.

The dynamic pressure causes the seal ring 42 to slightly separate from the end face 41a of the mating ring 41 against the pressing force of the coil spring 43 toward the mating ring 41. Therefore, a shaft-sealing function is achieved in that a very small gap is formed between the end faces 41a, 42a of the mating ring 41 and the seal ring 42 while permitting slight leakage of the fluid inside the machine into the gap.

Figure 5:
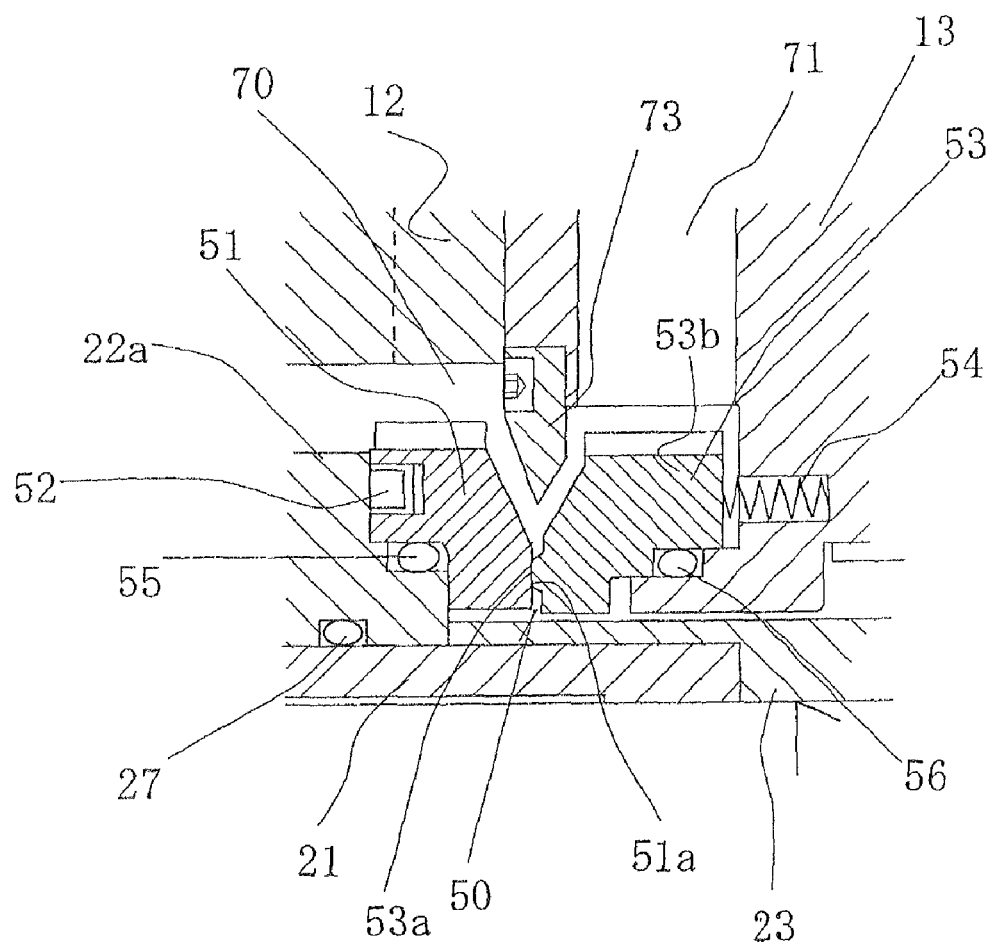
FIG. 5 is an enlarged partial sectional view of the third-stage seal in FIG. 1.

FIG. 5 is an enlarged partial sectional view of the third-stage seal 50 in FIG. 1.

The third-stage seal 50 of the outer side of the machine has a mating ring 51 for a rotational seal element that is inserted into a second sleeve 22, has a back surface that is supported by a flange 22a of the second sleeve 22, and is mounted on the flange 22a using a knock pin 52. On the other hand, a seal ring 53 for a stationary seal element faces the mating ring 51, is inserted into the collar 23, is locked on the external peripheral section 53b of the seal ring so as to prevent rotation, and is mounted on the seal case partition 13 in a state that allows movement in the axial direction; and the back surface is pressed in the axial direction by a coil spring 54 provided to the seal case partition 13.

The mating ring 51 and the seal ring 53 of the third-stage seal 50 are formed in an annular shape using SiC or another hard material. The space between the mating ring 51 and the second sleeve 22 is sealed using an O-ring 55. The space between the seal ring 53 and the seal case partition 13 is sealed using an O-ring 56.

The third-stage seal 50 having the configuration described above has a shaft-sealing function for sealing fluid present in an outer peripheral space of the third-stage seal, wherein an end face 53a of the seal ring 53 makes sliding contact with the end face 51a of the mating ring 51 that rotates together with the rotating shaft 20, so as to seal with suitable surface pressure by the urging force of the coil spring 54.

A first annular space 60 is formed between the inner periphery of the seal case partitions 11, 12 and the outer periphery of the first-stage seal 30 and the second-stage seal 40, and the first annular space 60 is in communication with a seal oil feed port 61 formed in the seal case partition 12 and a seal oil discharge port 62 formed in the seal case partition 11.

An annular guide member 64 for actively introducing seal fluid to the sliding section of the end face 31a of the mating ring 31 and the end face 33a of the seal ring 33 is mounted on the seal case partition 11 and provided to the outer periphery of the first-stage seal 30 of the first annular space 60.

A conducting hole 65 is provided between the first-stage seal 30 and the second-stage seal 40 of the first annular space 60 through the first sleeve 21 so as to act as a conduit between the outer surface of the shaft 20 and the inner surface of the first sleeve 21. Between the outer surface of the shaft 20 and the first sleeve 21, the O-ring 25 is disposed between the conducting hole 65 and the inside of the machine, and the O-ring 26 is disposed between the conducting hole 65 and the outside of the machine.

The seal oil supplied from the seal oil feed port 61 is an oil such as turbine oil, for example, and the pressure $p2$ of the seal oil is set to about $p1<p2<p1+3$ MPa, where $p1$ is the pressure of the fluid inside the machine. The pressure $p2$ of the seal oil is, to the extent possible, preferably set to be near the pressure $p1$ of the fluid inside the machine in order to reduce the load that acts on the sliding section of end face 31a of the mating ring 31 and the end face 33a of the seal ring 33, and is preferably set in a range of $p1+0.05$ MPa$\leq p2 \leq p1+0.5$ MPa so that the fluid inside the machine does not leak into the first annular space 60.

Thus, seal oil at a higher pressure than the fluid inside the machine is supplied to the first annular space 60, whereby fluid inside the machine does not leak into the first annular space 60 from the sliding section of the end face 33a of the seal ring 33 and the end face 31a of the mating ring 31 of the first stage seal 30. The seal oil of the first annular space 60 is also supplied from the conducting hole 65 into the space between the outer surface of the shaft 20 and the inner surface of the first sleeve 21, is disposed between the inside of the machine and the conducting hole 65 between the outer surface of the shaft 20 and the inner surface of the first sleeve 21, and acts on the O-ring 25. Therefore, the fluid inside the machine does not leak from between the outer surface of the shaft 20 and the inner surface of the first sleeve 21.

A second annular space 70 is formed between the inner periphery of the seal case partitions 12, 13 and the outer periphery of the third-stage seal 50 in communication with the inner peripheral space 66 of the second-stage seal 40, and the second annular space 70 is in communication with the coolant feed port 71 formed in the seal case partition 13 and a coolant discharge port 72 formed in the seal case partition 12. The coolant is used for recovering seal oil that has leaked from the first annular space 60 and for cooling various components constituting the third-stage seal 50.

An annular guide member 73 for actively introducing coolant to the sliding section of the end face 51a of the mating ring 51 and the end face 53a of the seal ring 53 is mounted on the seal case partition 13 and provided to the outer periphery of the third-stage seal 50 of the second annular space 70.

The coolant supplied from the coolant feed port 71 is, e.g., the same turbine oil as the seal fluid described above, and the pressure $p3$ of the coolant is expressed by the following relationship: atmospheric pressure $<p3<0.2$ MPa The shaft-sealing device configured as described above is mounted on the shaft-sealing section of the housing in, e.g., a compressor, a boiler feed water pump, or a device that handles supercritical carbon dioxide, as described above, and therefore seals high-pressure fluid inside the machine A portion of the high-pressure fluid inside the machine attempts to enter from the mating ring 31 and the seal ring 33 in the first-stage seal 30, which is a contact-type mechanical seal, into the first annular space 60 of the seal section, but the entry of the fluid inside the machine into the first annular space 60 is reliably blocked because seal fluid at higher pressure than the fluid inside the machine is supplied to the first annular space 60 and is at a higher pressure than the pressure $p1$ inside the machine.

In such a situation, the pressure $p2$ of the first annular space 60 is set to a pressure that is slightly higher than the fluid pressure $p1$ inside the machine. Therefore, the load that acts on the sliding section of the seal ring 33 and the mating ring 31 is kept to a minimum, and the service life of the first-stage seal 30 can be extended.

The second-stage seal 40 has a contactless mechanical seal structure; i.e., a structure in which the mating ring 41 rotates with a very small gap between the seal ring 42 due to the dynamic pressure generated by the dynamic pressure-generating grooves 411, 412 of the end face 41a, and the difference between the pressure $p2$ of the first annular space 60 and the pressure $p3$ of the second annular space 70 can be increased. As also occurs in such a case, the acting load is reduced, and abrasion and heat generated by sliding is substantially non-existent.

The supercritical pressure of carbon dioxide is 7.38 MPa, and the pressure of the fluid inside the machine is assumed to be 10 to 15 MPa. In such a case, the pressure $p2$ of the first annular space 60 is also the same or greater. Since the pressure $p3$ of the second annular space 70 is a maximum of about 0.2 MPa, pressure difference in front and behind the second-stage seal 40 also reaches about 10 to 15 MPa.

However, the mating ring 41 and the seal ring 42 in the second-stage seal 40 are not in contact with each other. Therefore, there is no acting load due to the high pressure difference and a stable shaft-sealing function can be obtained over a long period of time.

Since the second-stage seal 40 is a contactless mechanical seal, a small amount of the seal oil supplied to the first annular space 60 leaks into the second annular space 70, but the third-stage seal having a contact-type mechanical structure is disposed on the outer side of the machine, and the seal oil is reliably sealed by the third-stage seal and does not leak to the atmospheric air.

Also, since coolant is supplied from the coolant feed port 71 and is discharged from the coolant discharge port 72 in the second annular space 70, seal oil that has leaked into the second annular space 70 is reliably recovered.

The pressure $p3$ of the second annular space 70 is set to be slightly higher than the pressure outside the machine (e.g., atmospheric pressure). Therefore, the load that acts on the sliding section of the mating ring 51 and the seal ring 53 of the third-stage seal, which has a contact-type mechanical seal structure, can be kept to a minimum and the service life of the third-stage seal 50 can be extended.

Example 2

Figure 6:
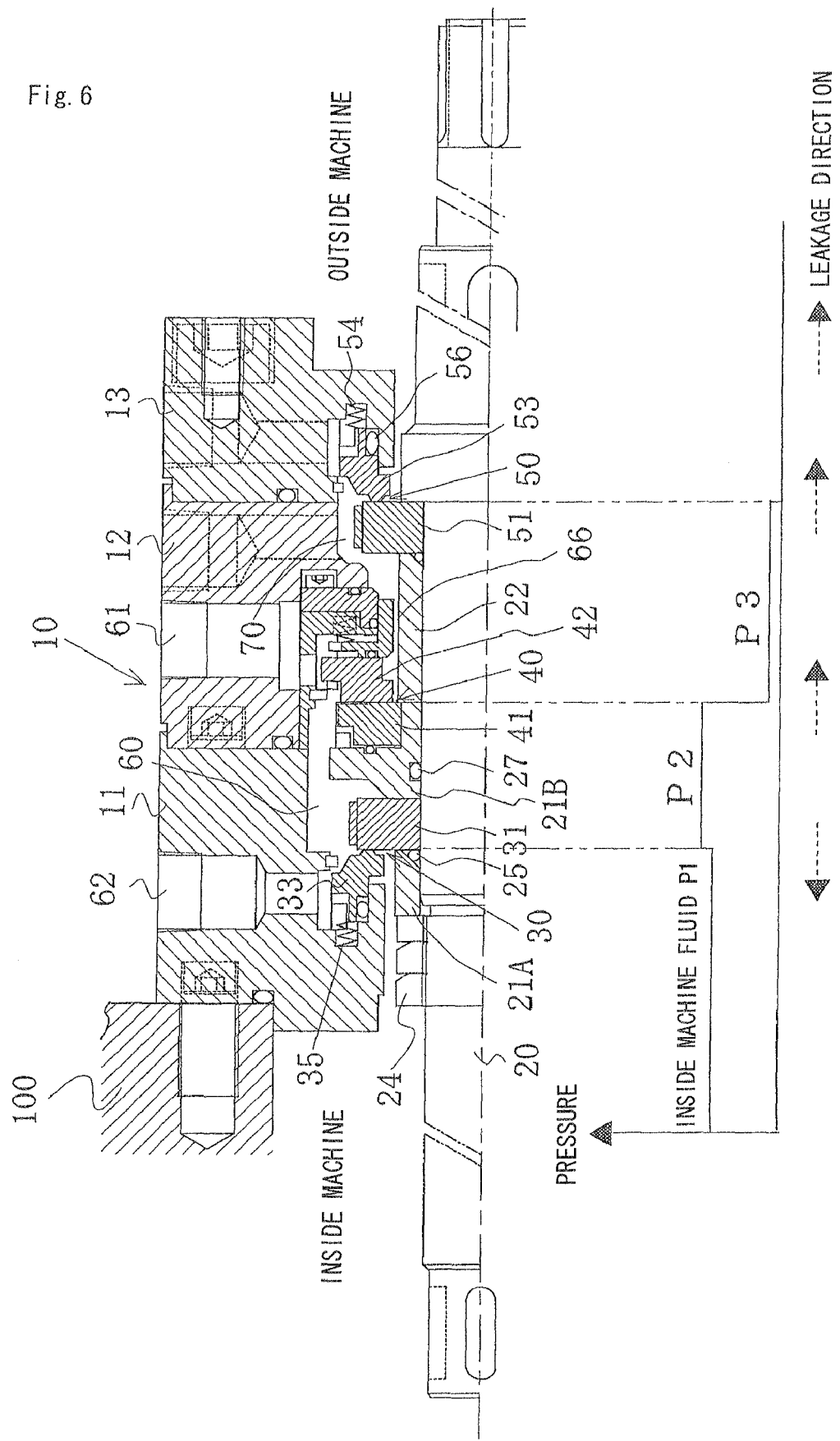
FIG. 6 is a front cross-sectional view showing the entire shaft-sealing device of example 2.
Figure 7:
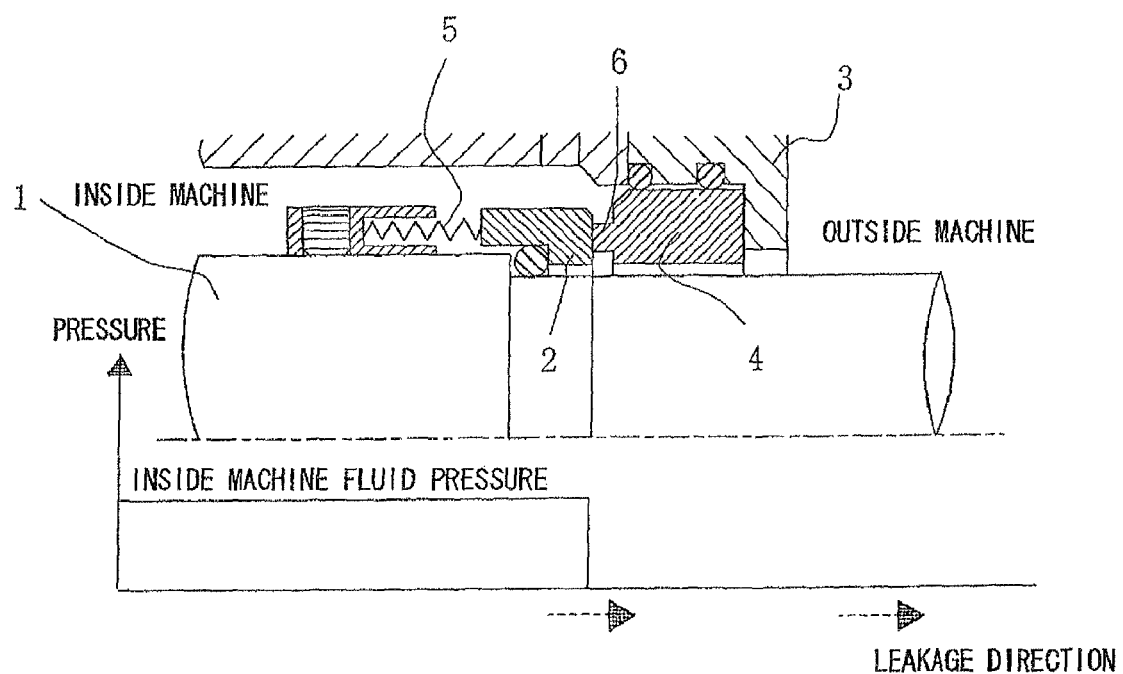
FIG. 7 is a view showing the single contact-type mechanical seal of Prior Art 1.
Figure 8:
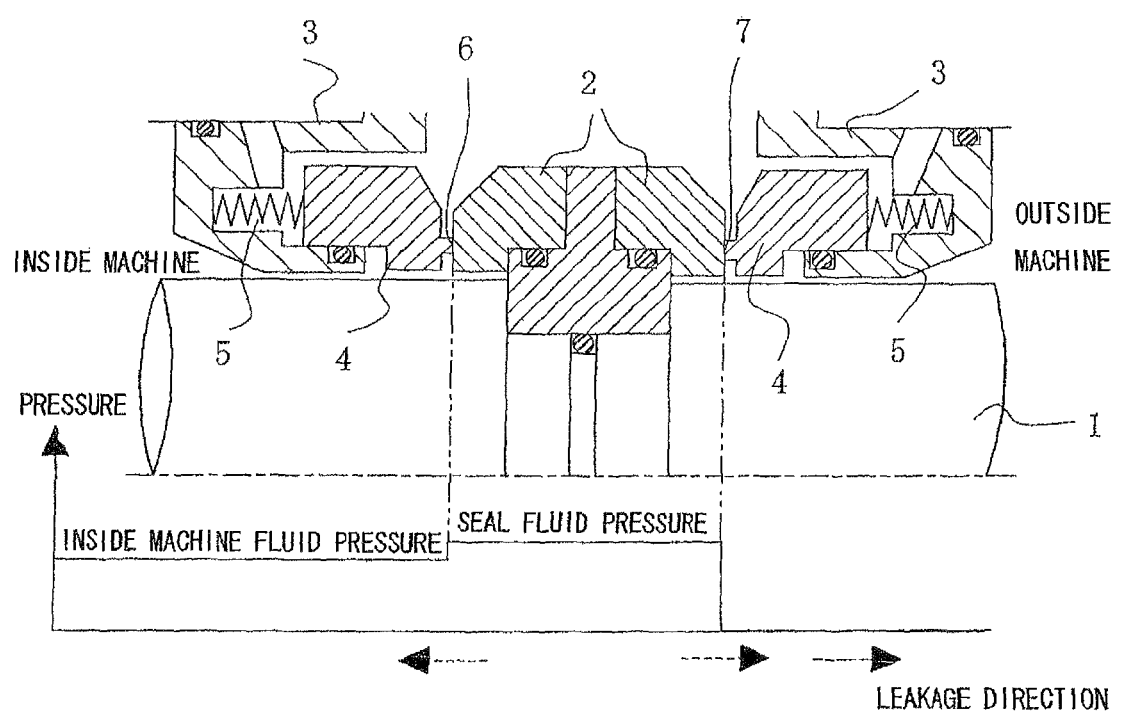
FIG. 8 is a view showing the double contact-type mechanical seal of Prior Art 2.
Figure 9:
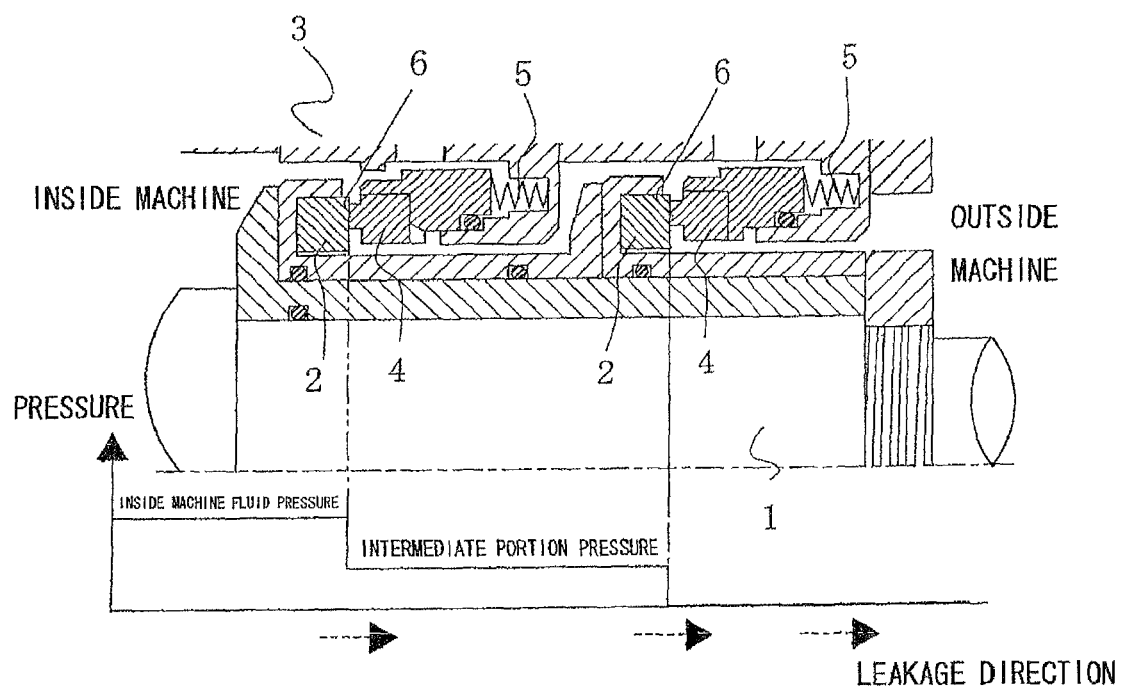
FIG. 9 is a view showing the tandem contact-type mechanical seal of Prior Art 3.
Figure 10:
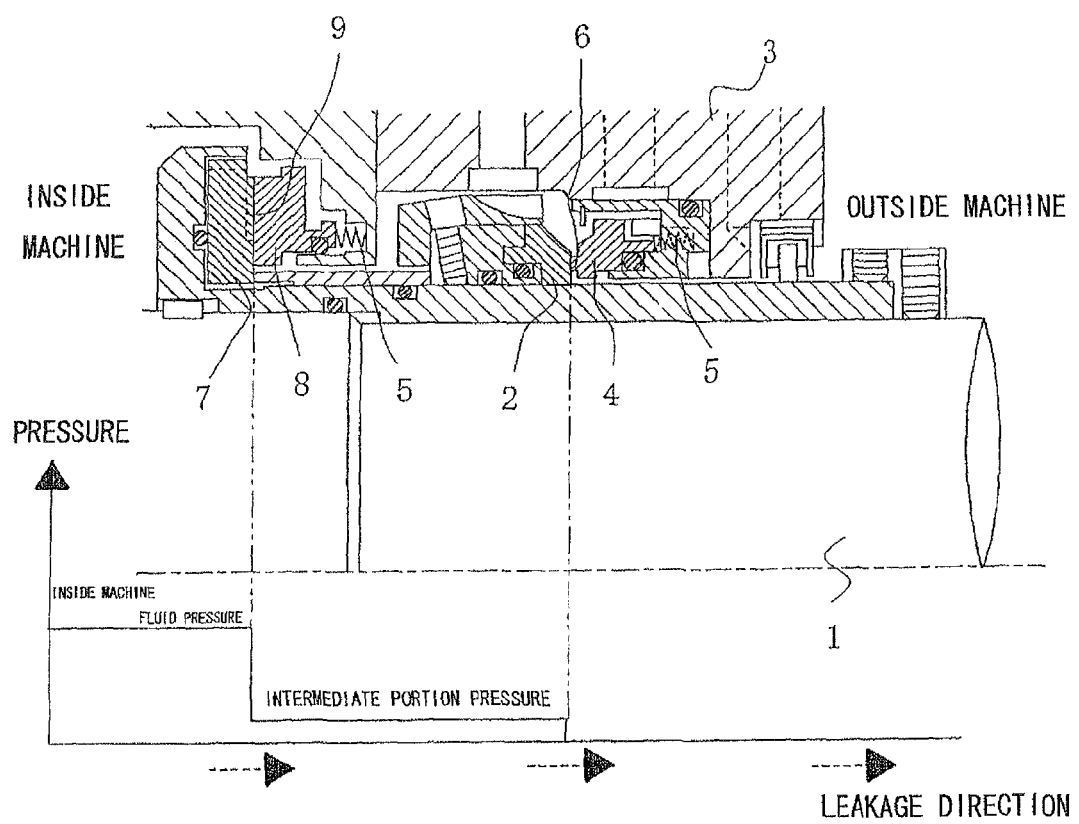
FIG. 10 is a view showing the contact/contactless mechanical seal of Prior Art 4.

FIG. 6 is a front cross-sectional view showing the entire shaft-sealing device of the present example 2.

The shaft-sealing device of the present example 2 has the same basic structure as example 1, and in FIG. 6, the same reference numerals as FIG. 1 refer to the same members as those in FIG. 1. The portions that are different from example 1 are mainly described below.

The three stage seals 30, 40, 50; i.e., the first-stage seal 30 of the inner side of the machine, the intermediate second-stage seal 40, and the third-stage seal 50 of the outer side of the machine are arranged in the axial direction in the peripheral space of the shaft between the seal case 10 and the rotating shaft 20. As with example 1, the first-stage seal 30 and the third-stage seal 50 have a contact-type mechanical seal structure in which the seal sections of the rotational seal element and the stationary seal element slide in close contact with each other; and the second-stage seal 40 has a contactless mechanical seal structure in which the seal sections of the rotational seal element and the stationary seal element are in a non-contact state with each other due to dynamic pressure.

The shaft 20 is relatively narrow and the shaft-sealing device is designed to be secured by a nut 24 disposed in the inner side of the machine. The mating ring 31 of the first-stage seal 30 and the mating ring 51 of the third-stage seal 50 are designed to be directly fitted and mounted onto the shaft 20.

Accordingly, the metal sleeve mounted on the external peripheral surface of the rotating shaft 20 has a structure in which a sleeve 21A of the inner side of the machine of the first sleeve 21 and a center sleeve 21B are arranged so as to sandwich the mating ring 31 of the first-stage seal 30; and the second sleeve 22 is arranged between the center sleeve 21B and the mating ring 51 of the third-stage seal 50.

A step section is formed in the shaft 20 so as to be in contact with the right end of the mating ring 51 of the third-stage seal 50, and the second sleeve 22 is mounted on the outer surface of the shaft 20 so as to be in contact with the left end of the mating ring 51. The center sleeve 21B of the first sleeve 21 is mounted on the outer surface of the shaft 20 so as to be in contact with the left end of the second sleeve 22 and the right end of the mating ring 31 of the first-stage seal 30, and the sleeve 21A of the inner side of the machine of the first sleeve 21 is mounted on the outer surface of the shaft 20 so as to be in contact with the left end of the mating ring 31 of the first-stage seal 30. The assembly is tightened in the axial direction using a nut 24 from the left end of the sleeve 21A of the inner side of the machine of the first sleeve 21.

The space between the rotating shaft 20 and the first sleeve 21 is sealed by the O-ring 25 positioned and provided on the contact surfaces of the right end of the first sleeve 21 and the left end of the mating ring 31 of the first-stage seal 30, and the space between the rotating shaft 20 and the first sleeve 21A is sealed by the O-ring 27.

The high-pressure seal oil supplied to the first annular space 60 enters the space between the outer surface of the shaft and the inner surface of the sleeves 21, 21A from the space between the left end of the first sleeve 21A and the right end of the mating ring 31 of the first-stage seal 30. The O-ring 25 and the O-ring 27 keep the pressure higher than the pressure of the fluid inside the machine.

Accordingly, the fluid inside the machine having dispersive properties in similar fashion to supercritical carbon dioxide can be reliably prevented from entering into the space between the outer surface of the shaft 20 and the inner surface of the sleeves 21, 21A and leaking to the exterior of the machine.

The shaft-sealing device of example 2 shown in FIG. 6 has a structure in which the mating ring 31 of the first-stage seal 30 and the mating ring 51 of the third-stage seal 50 are directly mounted on the rotating shaft 20 rather than being mounted on a sleeve. Therefore, the shape of the sleeve can be simplified, the space between the sleeve and the mating ring 31 and the mating ring 51 is not required to be sealed, and the O-rings can be omitted.

The invention claimed is:

1. A rotating shaft seal device comprised of a seal case mounted on a housing, and having plural seals arranged in a peripheral space of the shaft between the seal case and the rotating shaft disposed in first, second and third stages in an axial direction between the seal case and the rotating shaft passing through an inner periphery of the seal case; wherein the first-stage seal is on an inner side of the machine and the third-stage seal is on an outer side of the machine and both have a contact-type mechanical seal structure in which a rotational seal element and a stationary seal element are in close sliding contact with each other; and the second stage seal is located intermediate the first and third stages and has a non-contact-type mechanical seal structure in which the rotational seal element and the stationary seal element are kept by dynamic pressure so as not to be in contact with each other; and a seal fluid under higher pressure than the pressure of fluid inside the machine is supplied from feed port(s) into a first annular space surrounded by that portion of the seal case extending from said first-stage seal to the second-stage seal.

2. The shaft seal device according to claim 1, wherein a pressure p2 of the seal liquid supplied into the first annular space is set in a range of $p1+0.05$ MPa$\leqq p2\leqq p1+0.5$ MPa, wherein p2 is the pressure of the seal liquid supplied into the first annular space and p1 is the pressure of the fluid inside the machine.

3. The shaft seal device according to claim 2, wherein coolant is circulated in a second annular space surrounded by the seal case of the outer periphery of said third-stage seal in communication with the inner peripheral space of said second-stage seal.

4. The shaft seal device according to claim 3, wherein a pressure p3 of the coolant is set in a range expressed by the relationship: atmospheric pressure $<p3<0.2$ MPa, where p3 is the pressure of the coolant.

5. The shaft seal device according to claim 2, wherein said seal fluid under higher pressure than the pressure of fluid inside the machine is supplied between an outside surface of said rotating shaft and an inside surface of a sleeve fitted and secured to the rotating shaft.

6. The shaft seal device according to claim 5, wherein a hole for conducting the seal fluid is provided to said first annular space and between the outside surface of the rotating shaft and the inside surface of the sleeve.

7. The shaft seal device according to claim 6, wherein an O-ring is disposed in a position between the conducting hole and the inner side of the machine so as to be between the outside surface of said rotating shaft and the inside surface of the sleeve.

8. The shaft seal device according to claim 1, wherein coolant is circulated in a second annular space surrounded by the seal case of the outer periphery of said third-stage seal in communication with the inner peripheral space of said second-stage seal.

9. The shaft seal device according to claim 8, wherein a pressure p3 of the coolant is set in a range expressed by the relationship: atmospheric pressure <p3<0.2 MPa, where p3 is the pressure of the coolant.

10. The shaft seal device according to claim 1, wherein said seal fluid under higher pressure than the pressure of fluid inside the machine is supplied between an outside surface of said rotating shaft and an inside surface of a sleeve fitted and secured to the rotating shaft.

11. The shaft seal device according to claim 10, wherein a hole for conducting the seal fluid is provided to said first annular space and between the outside surface of the rotating shaft and the inside surface of the sleeve.

12. The shaft seal device according to claim 11, wherein an O-ring is disposed in a position between the conducting hole and the inner side of the machine so as to be between the outside surface of said rotating shaft and the inside surface of the sleeve.

13. The shaft seal device according to claim 1, wherein coolant is circulated in a second annular space surrounded by the seal case of the outer periphery of said third-stage seal in communication with the inner peripheral space of said second-stage seal.

14. The shaft seal device according to claim 13, wherein a pressure p3 of the coolant is set in a range expressed by the relationship: atmospheric pressure <p3<0.2 MPa, where p3 is the pressure of the coolant.

15. The shaft seal device according to claim 1, wherein said seal fluid under higher pressure than the pressure of fluid inside the machine is supplied between an outside surface of said rotating shaft and an inside surface of a sleeve fitted and secured to the rotating shaft.

16. The shaft seal device according to claim 15, wherein a hole for conducting the seal fluid is provided to said first annular space and between the outside surface of the rotating shaft and the inside surface of the sleeve.

17. The shaft seal device according to claim 16, wherein an O-ring is disposed in a position between the conducting hole and the inner side of the machine so as to be between the outside surface of said rotating shaft and the inside surface of the sleeve.

* * * * *